Patented Feb. 7, 1933

1,896,335

UNITED STATES PATENT OFFICE

ANDREW T. K. TSENG, OF DETROIT, MICHIGAN, ASSIGNOR TO BEACH LABORATORIES, INC., OF DETROIT, MICHIGAN, A CORPORATION OF MICHIGAN

MOLDED BRAKE LINING

No Drawing. Application filed July 15, 1929. Serial No. 378,567.

This invention relates to molded brake linings for the brake shoes or bands of brakes or clutches such as are used in automobiles, elevators and other machines.

One of the objects of the present invention is the provision of a molded brake lining that will have high frictional resistance and yet will not score or scratch the brake drum with which it is associated.

Another object of this invention is the provision of a molded brake lining that will not be deleteriously affected by high heats during the braking operation.

A further object of this invention is the provision of a brake lining composed of comparatively inexpensive materials and which can be economically produced.

Other objects and advantages will be apparent from the following description, wherein is disclosed a preferred formula and process for producing my improved brake lining.

The brake lining preferably is composed of the following ingredients, which may be varied in the compound between the following minimum and maximum percentages by weight:

| | Per cent |
|---|---|
| Amber brown crepe rubber | 12-14 |
| Litharge | 5-20 |
| Barytes | 10-50 |
| Zinc oxide | 2-10 |
| Powdered gas black—(preferably from natural gas) | 1-15 |
| Powdered sulphur | 1-10 |
| Scrap asbestos yarn, with which is mixed approximately ⅓ of its weight of brass wire particles | 5-40 |
| Graphite | 1-15 |

Of these ingredients I have found that the following proportions give a highly satisfactory compound:

| | Per cent |
|---|---|
| Amber brown crepe rubber | 14 |
| Litharge | 10 |
| Barytes | 34 |
| Zinc oxide | 5 |
| Gas black | 3 |
| Graphite | 4 |
| Powdered sulphur | 4 |
| Mixed asbestos yarn and brass wire | 26 |
| | 100 |

The amber brown crepe rubber is utilized as a binder for the molding of the several ingredients of my improved compound and associates with the sulphur in vulcanization, the litharge acting as an accellerator for the vulcanization and also as a filler of friction-producing material that has the capacity of combining with any free sulphur that might exist after the vulcanizing operation. The barytes is utilized as an inexpensive filler that increases the volume and weight of the compound which will not scratch the brake drum. The mixed asbestos yarn and comminuted brass wire serve with the barytes as the body of the brake lining and offer frictional resistance with resistance to high heats that might occur during the braking operation. The gas black has the capacity of increasing the wearing qualities of the compound and is in itself a friction-producing element that will resist high heat. I prefer to use the gas black obtained from natural gas in the Texas regions of the United States, though gas black from the Pennsylvania regions will operate somewhat less efficiently. The zinc oxide acts as a softener for the compound, tending to prevent its becoming flint-like when fully vulcanized, while the graphite is introduced to serve as a lubricant that with the zinc oxide will prevent the compound from scratching and scoring the brake drum. It will be noted that my improved compound differs from all known compounds of similar nature in having no organic material to serve as a solvent or otherwise in the formation of the brake lining.

In producing my improved brake lining I preferably first place the amber brown crepe rubber in a mill and grind it at regular speeds for approximately five to ten minutes until all cells are broken down, which is indicated by the plastic surface of the rubber in the mill. The other ingredients, with the exception of the sulphur and mixed scrap yarn and brass wire, are then preliminarily mixed together in a mixer and then gradually added to the rubber in the mill, the mill being turned until the several ingredients are thoroughly worked in, which can also be determined by the appearance of the rubber. The sulphur is then added and the mill turned for a further short period of time. If the heat at this time rises over 200° F. the mill should be cooled with air or water. The ingredients are then preferably let stand for approximately twenty-four hours, though this is not absolutely necessary, and when the materials are mixed in a large mill that is suitably cooled by air or water cooling, it is possible to proceed almost immediately with the addition of the scrap yarn and brass wire. The mixed scrap yarn and brass wire is then gradually added to the ingredients and preferably in a mill having a scraper on the back roll. The mill is turned until the ingredients are thoroughly mixed and during this turning the mill should be cooled by air or water cooling.

The compound is then removed from the mill and passed through suitable mill or calender rolls until its thickness is approximately .015 to .020 oversize for the desired thickness of brake lining. Thus if brake lining of $\frac{3}{16}$ inch thickness is desired, the compound is rolled to approximately .200 to .210 inches in thickness. The rolled compound is then cut into long strips of the desired width for the brake lining to be made, as for example, 1½, 1¾ or 2 inches wide. The strips are then cut to the desired length for molding. The cut strips are then taken into the curing room and vulcanized in molds under saturated steam pressures of 85 to 90 pounds, the temperature of the mold being kept under 300° F. The mold parts are preferably compressed by hydraulic pressure of at least 1,000 pounds per square inch. I preferably cure the compound in the vulcanizer for approximately thirty minutes, which leaves it still soft and only about three-fourths cured.

The molded brake lining is then allowed to cool, whereupon its surfaces are ground in suitable grinding machines to bring the brake lining to the desired thickness. The edges are then smoothed and if desired the corners are ground down to rounded or diagonal shapes.

The brake lining is then ready to be put upon the brake shoe or band. While it may be shaped in the mold to a desired contour, it is preferably left flat and bent around the brake shoe or band during positioning of the lining. The lining is still comparatively soft for molded brake linings, and when used under ordinary conditions remains in substantially this form with the friction resistance offered thereby remaining substantially the same. However, should the lining become excessively heated by certain braking operations, the brake lining will not be deleteriously affected by the excessive heat, the worst heats generated during the braking operation serving merely to further cure and harden the lining and thereby increasing its tensile strength without seriously impairing its friction-producing qualities.

It is to be understood that the preferable formula disclosed herein may be varied to accentuate certain of the desirable features of the compound, and also that the process described herein for producing the brake lining may be varied in many ways.

Having described my invention I claim:

1. A molded brake lining composed of the following ingredients:

| | Per cent |
|---|---|
| Amber brown crepe rubber | 14 |
| Litharge | 10 |
| Barytes | 34 |
| Zinc oxide | 5 |
| Gas black | 3 |
| Graphite | 4 |
| Powdered sulphur | 4 |
| Mixed asbestos yarn and brass wire | 26 |
| | 100 |

2. A molded brake lining composed of the following ingredients:

| | Per cent |
|---|---|
| Amber brown crepe rubber, from | 12 to 14 |
| Litharge, from | 5 to 20 |
| Barytes, from | 10 to 50 |
| Zinc oxide, from | 2 to 10 |
| Powdered gas black, from | 1 to 15 |
| Powdered sulphur, from | 1 to 10 |
| Mixed asbestos yarn and brass particles, from | 5 to 40 |
| Graphite, from | 1 to 15 |

In testimony whereof I sign this specification.

ANDREW T. K. TSENG.